(12) United States Patent
Zhang

(10) Patent No.: US 12,019,889 B2
(45) Date of Patent: Jun. 25, 2024

(54) TASK ALLOCATION METHOD AND SYSTEM FOR SOLID STATE DRIVE, ELECTRONIC DEVICE, AND STORAGE MEDIUM

(71) Applicant: INSPUR SUZHOU INTELLIGENT TECHNOLOGY CO., LTD., Jiangsu (CN)

(72) Inventor: Qiankun Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/263,142

(22) PCT Filed: Oct. 29, 2021

(86) PCT No.: PCT/CN2021/127520
§ 371 (c)(1),
(2) Date: Jul. 27, 2023

(87) PCT Pub. No.: WO2023/284173
PCT Pub. Date: Jan. 19, 2023

(65) Prior Publication Data
US 2024/0036755 A1 Feb. 1, 2024

(30) Foreign Application Priority Data
Jul. 13, 2021 (CN) .......................... 202110791541.0

(51) Int. Cl.
*G06F 9/46* (2006.01)
*G06F 3/06* (2006.01)
*G06F 9/50* (2006.01)

(52) U.S. Cl.
CPC ............ *G06F 3/064* (2013.01); *G06F 3/0604* (2013.01); *G06F 3/0679* (2013.01);
(Continued)

(58) Field of Classification Search
CPC ............ G06F 9/5061; G06F 2209/501; G06F 2209/5011; G06F 2209/506
See application file for complete search history.

(56) References Cited

U.S. PATENT DOCUMENTS 10,866,834 B2   12/2020   Herdrich et al.
2019/0310892 A1  10/2019  Frolikov

FOREIGN PATENT DOCUMENTS

CN   103019958 A   4/2013
CN   106201356 A   12/2016
(Continued)

OTHER PUBLICATIONS

International Search Report and Written Opinion received for PCT Serial No. PCT/CN2021/127520 dated Apr. 13, 2022, 10 pgs.
(Continued)

*Primary Examiner* — Gregory A Kessler
(74) *Attorney, Agent, or Firm* — Merchant & Gould P.C.

(57) ABSTRACT

Provided are a task allocation method and system for a solid state drive, an electronic device, and a storage medium. The task allocation method includes: dividing data managers into a plurality of data management groups; determining a service scenario according working states of all sibling master data managers; when the service scenario is a high-bandwidth scenario, controlling the sibling master data managers and sibling slave data managers to work in corresponding Central Processing Unit (CPU) cores, and allocating tasks to all the sibling master data managers and all the sibling slave data managers; and when the service scenario is a high-quality-of-service scenario, controlling the sibling master data managers to work in corresponding CPU cores, and allocating tasks to all the sibling master data managers.

20 Claims, 3 Drawing Sheets

(52) U.S. Cl.
CPC ...... *G06F 9/5061* (2013.01); *G06F 2209/501* (2013.01); *G06F 2209/5011* (2013.01); *G06F 2209/506* (2013.01)

(56) References Cited

FOREIGN PATENT DOCUMENTS

| | | | |
|---|---|---|---|
| CN | 109154883 | A | 1/2019 |
| CN | 109614038 | A | 4/2019 |
| CN | 110287152 | A | 9/2019 |
| CN | 111984184 | A | 11/2020 |
| CN | 113254222 | A | 8/2021 |

OTHER PUBLICATIONS

Chinese Search Report received for CN Serial No. 202110791541.0 dated Aug. 16, 2021, 2 pgs.
Chinese Decision to Grant received for CN Serial No. 202110791541.0 dated Aug. 26, 2021, 3 pgs.
"The Research of Efficient Real-Time Disk-Scheduling with Fair Bandwidth Distribution", Lou Zhaosheng, School of Information Science & Engineering, Central South University, ChangSha Hunan P.R.C., 49 pgs.

TASK ALLOCATION METHOD AND SYSTEM FOR SOLID STATE DRIVE, ELECTRONIC DEVICE, AND STORAGE MEDIUM

CROSS-REFERENCE TO RELATED APPLICATIONS

The present application is a National Stage Filing of PCT International Application No. PCT/CN2021/127520 filed on Oct. 29, 2021, which claims priority to Chinese Patent Application No. 202110791541.0, filed with the China National Intellectual Property Administration on Jul. 13, 2021, which is incorporated in its entirety herein by reference.

TECHNICAL FIELD

The present disclosure relates to the technical field of data processing, and particularly to a task allocation method and system for a Solid State Drive (SSD), an electronic device, and a storage medium.

BACKGROUND

In general, an SSD is internally divided into different modules according to different functions, such as Data Managers (DM) responsible for data management, Write Managers (WM) responsible for writing into NAND flash memory, Reclaim Block Managers (RBM) responsible for garbage collection, and Journal Managers (JM) responsible for snapshot save. The Quality of service (QOS) of a system is affected by delays of read and write operations. A Band Width (BW) of the system is mainly affected by concurrency of tasks but is insensitive to the delays.

In general, Non-Volatile Memory Express (NVME) (a register interface and command set for accessing storage attached via Peripheral Component Interconnect (PCI) express) commands are processed by the data manager. In order to achieve high quality of service, the data manager is required to respond to commands in a host Submission Queue (SQ) in time, and context in the data manager is required to be processed in time. However, under the condition of limited hardware of a Central Processing Unit (CPU), a limited number of CPU cores are allocated to the data manager, and if a high band width is required, concurrency in the data manager will be tied to a processing capacity of the CPU.

Therefore, how to set a task allocation mode according to a service scenario, so as to process data with high quality of service or high band width under the condition of limited hardware resources is a technical problem to be solved by those having ordinary skill in the art.

SUMMARY

Embodiments of the present disclosure provide a task allocation method and system for a solid state drive, an electronic device, and a storage medium, which may set a task allocation mode according to a service scenario, so as to process data with high quality of service or high band width under the condition of limited hardware resources.

In order to solve the above technical problem, the embodiments of the present disclosure provide a task allocation method for a solid state drive. The solid state drive includes data managers configured to execute data management, write managers configured to execute data write, reclaim block managers configured to collect garbage data, and journal managers configured to save snapshots. The task allocation method for the solid state drive includes:

dividing the data managers into a plurality of data management groups, where each data management group includes a sibling master data manager and at least one sibling slave data manager;

determining a service scenario according to working states of all sibling master data managers;

when the service scenario is a high-band-width scenario, controlling the sibling master data managers and the sibling slave data managers to work in corresponding Central Processing Unit (CPU) cores, and allocating tasks to all the sibling master data managers and all the sibling slave data managers, where in the high-bandwidth scenario, the reclaim block managers of the solid state drive corresponding to all the CPU cores are in working states; and when the service scenario is a high-quality-of-service scenario, controlling the sibling master data managers to work in corresponding CPU cores, setting working states of the sibling slave data managers as idle states through the sibling master data managers, and allocating tasks to all the sibling master data managers, where in the high-quality-of-service scenario, the write managers, the reclaim block managers and the journal managers of the solid state drive all work only in CPU cores corresponding to the sibling slave data managers.

In some exemplary embodiments, dividing the data managers of the solid state drive into the plurality of data management groups includes: determining a corresponding relation between the data managers and the write managers in the solid state drive, and setting data managers corresponding to a same write manager as belonging to a same data management group.

In some exemplary embodiments, determining the service scenario according to the working states of all the sibling master data managers includes:

setting the working states of the sibling master data managers according to loading types of the sibling master data managers in a continuous time period;

determining whether the working states of all the sibling master data managers are the same; and determining, when the working states of all the sibling master data managers are the same, the service scenario according to the working states of all the sibling master data managers.

In some exemplary embodiments, setting the working states of the sibling master data managers according to the loading types of the sibling master data managers in the continuous time period includes:

counting, according to time slices, the number of times of read and write request allocation received by the sibling master data managers;

setting the loading types of the sibling master data managers as high-loading types when the number of times of read and write request allocation is greater than a preset value;

setting the loading types of the sibling master data managers as low-loading types when the number of times of read and write request allocation is less than or equal to the preset value;

setting the working states of the sibling master data managers as high-loading working states when the loading types of the sibling master data managers in the continuous time period are all high-loading types; and setting the working states of the sibling master data managers as low-loading working states when the loading types of the sibling master data managers in the continuous time period are all low-loading types.

In some exemplary embodiments, determining the service scenario according to the working states of all the sibling master data managers includes:

determining that the service scenario is the high-bandwidth scenario when the working states of all the sibling master data managers are the high-loading working states; and determining that the service scenario is the high-quality-of-service scenario when the working states of all the sibling master data managers are the low-loading working states.

In some exemplary embodiments, determining whether the working states of all the sibling master data managers are the same includes:

selecting a sibling master data manager satisfying preset conditions from all the sibling master data managers, where the preset conditions are that the working state of the sibling master data manager changes and the loading type of the sibling master data manager is different from a loading type of the sibling slave data manager belonging to a same data management group as the sibling master data manager;

writing the working state of the sibling master data manager satisfying the preset conditions into a query message and forwarding the query message to a next sibling master data manager in a preset sequence, such that all the sibling master data managers write their respective working states into the query message; and determining whether the working states of all the sibling master data managers are the same according to the query message.

In some exemplary embodiments, after determining the service scenario according to the working states of all the sibling master data managers, the method may further include:

setting a first sibling master data manager that writes the working state into the query message as a start module, and controlling the start module to send service scenario switching messages to the write managers, the reclaim block managers and the journal managers of the solid state drive.

The embodiments of the present disclosure further provide a task allocation system for a solid state drive. The solid state drive includes data managers configured to execute data management, write managers configured to execute data write, reclaim block managers configured to collect garbage data, and journal managers configured to save snapshots. The task allocation system for the solid state drive includes:

a grouping module, configured to divide the data managers into a plurality of data management groups, where each data management group includes a sibling master data manager and at least one sibling slave data manager;

a scenario determining module, configured to determine a service scenario according to working states of all sibling master data managers;

a first task allocating module, configured to control, when the service scenario is a high-band-width scenario, the sibling master data managers and the sibling slave data managers to work in corresponding CPU cores, and allocate tasks to all the sibling master data managers and all the sibling slave data managers, where in the high-band-width scenario, the reclaim block managers of the solid state drive corresponding to all the CPU cores are in working states; and a second task allocating module, configured to control, when the service scenario is a high-quality-of-service scenario, the sibling master data managers to work in corresponding CPU cores, set working states of the sibling slave data managers as idle states through the sibling master data managers, and allocate tasks to all the sibling master data managers, where in the high-quality-of-service scenario, the write managers, the reclaim block managers and the journal managers of the solid state drive all work only in CPU cores corresponding to the sibling slave data managers.

The embodiments of the present disclosure further provide a storage medium. The storage medium stores a computer program, and the computer program, when being executed by a processor, causes the processor to implement the operations included in the above task allocation method for the solid state drive.

The embodiments of the present disclosure further provide an electronic device. The electronic device includes a memory and a processor, the memory stores a computer program, and the processor implements operations included in the above task allocation method for the solid state drive when calling the computer program in the memory.

The embodiments of the present disclosure provide a task allocation method for a solid state drive. The method includes: dividing data managers of the solid state drive into a plurality of data management groups, where each data management group includes a sibling master data manager and at least one sibling slave data manager; determining a service scenario according to working states of all sibling master data managers; when the service scenario is a high-band-width scenario, controlling the sibling master data managers and the sibling slave data managers to work in corresponding CPU cores, and allocating tasks to all the sibling master data managers and all the sibling slave data managers, where in the high-band-width scenario, the reclaim block managers of the solid state drive corresponding to all the CPU cores are in working states; and when the service scenario is a high-quality-of-service scenario, controlling the sibling master data managers to work in corresponding CPU cores, setting working states of the sibling slave data managers as idle states through the sibling master data managers, and allocating tasks to all the sibling master data managers, where in the high-quality-of-service scenario, the write managers, the reclaim block managers and the journal managers of the solid state drive all work only in CPU cores corresponding to the sibling slave data managers.

According to the embodiments of the present disclosure, the data managers of the solid state drive are divided into a plurality of data management groups, and a current service scenario is determined according to working states of sibling master data managers in all the data management groups. A high-band-width scenario requires an increase in the throughput of data. According to the embodiments of the present disclosure, when the service scenario is a high-band-width scenario, the sibling master data managers and the sibling slave data managers are controlled to work in their corresponding CPU cores, so as to allocate tasks to all the sibling master data managers and all the sibling slave data managers. A high-quality-of-service scenario requires a reduction in the task processing delay. According to the embodiments of the present disclosure, when the service scenario is a high-quality-of-service scenario, the sibling master data managers are controlled to work in corresponding CPU cores, and working states of the sibling slave data managers are set as idle states through the sibling master data managers, so as to allocate tasks only to all the sibling master data managers. It can be seen from the above content that, according to the embodiments of the present disclosure, all the data managers are controlled to jointly process data management tasks in a high-band-width scenario, such that a throughput of data is improved; and the sibling master data managers are controlled to work in the corresponding CPU cores in the high-quality-of-service scenario, and the write managers, the reclaim block managers and the journal managers of the solid state drive do not work in the same CPU cores as the sibling master data managers such that timeliness of processing tasks by the sibling master data managers may be improved, and a waiting delay may be reduced. Therefore, according to the embodiments of the present disclosure, a task allocation mode may be set according to the service scenario, so as to process data with high quality of service or high band width under the condition of limited hardware resources. The embodiments of the present disclosure further provide a task allocation system for a solid state drive, an electronic device, and a storage medium, which have the above beneficial effects and will not be repeated herein.

BRIEF DESCRIPTION OF THE DRAWINGS

In order to illustrate embodiments of the present disclosure more clearly, accompanying drawings required to be used for the embodiments will be briefly introduced. Apparently, the accompanying drawings in the following description are merely some embodiments of the present disclosure, and those having ordinary skill in the art would also have obtained other accompanying drawings according to these accompanying drawings without involving any inventive effort.

DETAILED DESCRIPTION

In order to make objectives, technical solutions, and advantages of embodiments of the present disclosure clearer, technical solutions of embodiments of the present disclosure will be clearly and completely described below in combination with accompanying drawings in the embodiments of the present disclosure. Apparently, the described embodiments are some embodiments rather than all embodiments of the present disclosure. Based on the embodiments of the present disclosure, all other embodiments obtained by those having ordinary skill in the art without involving any inventive effort fall within the scope of protection of the present disclosure.

Figure 1:
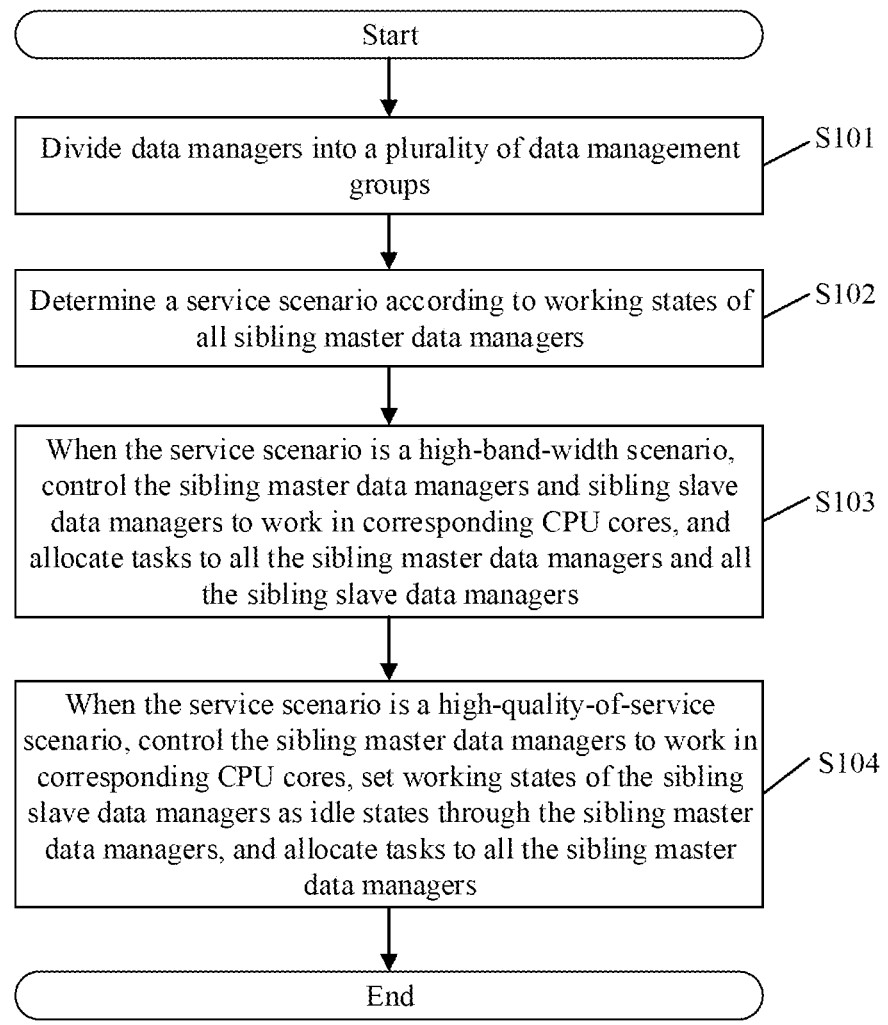
FIG. 1 is a flow diagram of a task allocation method for a solid state drive according to some embodiments of the present disclosure.

With reference to FIG. 1 below, a flow diagram of a task allocation method for a solid state drive (SSD) according to some embodiments of the present disclosure is shown in FIG. 1.

The task allocation method for the SSD may include the following operations S101 to S104.

At S101, data managers (DMs) are divided into a plurality of data management groups.

The embodiments may be applied to electronic devices such as computers and servers, the data managers of the solid state drive may be divided into a plurality of data management groups according to a preset rule, and each data management group may include a sibling master data manager (DM_SM) and at least one sibling slave data manager (DM_SS).

In some exemplary embodiments, the solid state drive may include a plurality of Data Managers (DMs), a plurality of Write Managers (WMs), a plurality of Reclaim Block Managers (RBMs) and a plurality of Journal Managers (JMs), and each write manager may correspond to two data managers. The data manager is responsible for processing read and write messages in a Non-Volatile Memory Express (NVMe) (which is a non-volatile memory host controller interface specification) submission queue, such that a host data of a write command may be received and a read command flow may be processed. The write manager, also known as NAND (computer flash memory device) write manager, is responsible for managing NAND blocks and maintaining organizational data stripes, Logical Block Address-Physical Block Address (LBA-PBA) mapping, and wear leveling. The reclaim block manager, also known as NAND block reclaim module, is responsible for garbage collection of blocks and moving valid data in one block to a new block. The journal manager, also known as journal module, is responsible for saving metadata of the solid state drive during running, so as to recover according to saved content after power on.

As an exemplary implementation of the embodiments, a corresponding relation between the data managers and the write managers in the solid state drive may be determined, and data managers corresponding to a same write manager are set as belonging to a same data management group. That is, each data management group includes one sibling master data manager and one sibling slave data manager. A master-slave allocation ratio in the data management group may be determined according to a ratio of the number of data managers that are always in working states and the number of data managers that may enter working states. In another grouping method, one data management group may include one sibling master data manager and at least one sibling slave data manager.

At S102, a service scenario is determined according to working states of all sibling master data managers.

A loading type and a working state of the sibling master data manager in the data management group may be set according to a pressure of read and write request allocation. A loading type and a working state of the sibling slave data manager may be set through the sibling master data manager according to a current service scenario, and the sibling slave data manager does not have authority to modify its own loading type and working state.

The service scenario mentioned in the embodiments includes a high-band-width scenario and a high-quality-of-service scenario. The high-band-width scenario refers to a service scenario requiring a high throughput. The high-quality-of-service scenario refers to a service scenario requiring a low delay.

In some exemplary embodiments, when a service pressure of the sibling master data manager is less than or equal to a threshold value, the working state of the sibling master data manager is a low-loading working state. When the service pressure of the sibling master data manager is greater than the threshold value, the working state of the sibling master data manager is a high-loading working state. The above service pressure may be determined according to a resource quantity of read and write request allocation per second. The threshold value may be set according to an application scenario, for example, may be set as 16 M/s. When the working states of all the sibling master data managers are low-loading working states, it is determined that the service scenario is a high-quality-of-service scenario. When the working states of all the sibling master data managers are high-loading working states, it is determined that the service scenario is a high-band-width scenario.

At S103, when the service scenario is a high-band-width scenario, the sibling master data managers and the sibling slave data managers are controlled to work in corresponding CPU cores, and tasks are allocated to all the sibling master data managers and all the sibling slave data managers.

This operation is based on a case that a current service scenario is a high-band-width scenario. In this case, as many data managers as possible are required to process tasks. Each CPU core corresponds to a data manager, and the data managers work in the corresponding CPU cores. In this operation, the sibling master data managers and the sibling slave data managers are controlled to work in the corresponding CPU cores, and tasks are allocated to all the sibling master data managers and all the sibling slave data managers. In this case, all the data managers are in working states, and a throughput of data processing may be improved under the condition of limited hardware resources. In a high-band-width scenario, the reclaim block managers of the solid state drive corresponding to all the CPU cores are in working states, and the write managers and the journal managers of the solid state drive only work in CPU cores corresponding to the sibling slave data managers.

With eight CPU cores from CPU0 to CPU7 as an example, in a high-band-width scenario, data managers in all the cores from CPU0 to CPU7 are in working states, reclaim block managers in all the cores from CPU0 to CPU7 are in working states, write managers in cores CPU1, CPU3, CPU5 and CPU7 are in working states, and journal managers in cores CPU1, CPU3, CPU5 and CPU7 are in working states.

At S104, when the service scenario is a high-quality-of-service scenario, the sibling master data managers are controlled to work in corresponding CPU cores, working states of the sibling slave data managers are set as idle states through the sibling master data managers, and tasks are allocated to all the sibling master data managers.

This operation is based on a case that a current service scenario is a high-quality-of-service scenario. In this case, it is required to reduce a delay of waiting for task processing. Therefore, in this operation, the sibling master data managers are controlled to work in corresponding CPU cores, the working states of the sibling slave data managers are set as idle states through the sibling master data managers, and tasks are allocated to all the sibling master data managers. Through the above method, the sibling master data managers may be in working states, and the sibling slave data managers may be in idle states. In some exemplary embodiments, in a high-quality-of-service scenario, the write managers, the reclaim block managers and the journal managers of the solid state drive work only in CPU cores corresponding to the sibling slave data managers. Through the above method, the sibling master data managers may be work in CPU cores different from those CPU cores where other modules work, so as to ensure that the sibling master data managers may respond to commands in a host submission queue in time, and context in the sibling master data managers may be processed in time.

With eight CPU cores from CPU0 to CPU7 as an example, in a high-quality-of-service scenario, data managers in cores CPU0, CPU2, CPU4 and CPU6 are in working states, data managers in CPU1, CPU3, CPU5 and CPU7 are in idle states, write managers in CPU1, CPU3, CPU5 and CPU7 are in working states, journal managers in CPU1, CPU3, CPU5 and CPU7 are in working states, and reclaim block managers in CPU1, CPU3, CPU5 and CPU7 are in working states.

According to the embodiments, the data managers of the solid state drive are divided into a plurality of data management groups, and a current service scenario is determined according to working states of the sibling master data managers in all the data management groups. A high-band-width scenario requires an increase in the throughput of data. According to the embodiments, when the service scenario is a high-band-width scenario, the sibling master data managers and the sibling slave data managers are controlled to work in their corresponding CPU cores, so as to allocate tasks to all the sibling master data managers and all the sibling slave data managers. A high-quality-of-service scenario requires a reduction in the task processing delay. According to the embodiments, when the service scenario is a high-quality-of-service scenario, the sibling master data managers are controlled to work in corresponding CPU cores, and working states of the sibling slave data managers are set as idle states through the sibling master data managers, so as to allocate tasks only to all the sibling master data managers. It can be seen from the above content that, according to the embodiments of the present disclosure, all the data managers are controlled to jointly process data management tasks in a high-band-width scenario, such that a throughput of data is improved; and the sibling master data managers are controlled to work in the corresponding CPU cores in the high-quality-of-service scenario, and the write managers, the reclaim block managers and the journal managers of the solid state drive do not work in the same CPU cores as the sibling master data managers such that timeliness of processing tasks by the sibling master data managers may be improved, and a waiting delay may be reduced. Therefore, according to the embodiments of the present disclosure, a task allocation mode may be set according to the service scenario, so as to process data with high quality of service or high band width under the condition of limited hardware resources.

Figure 2:
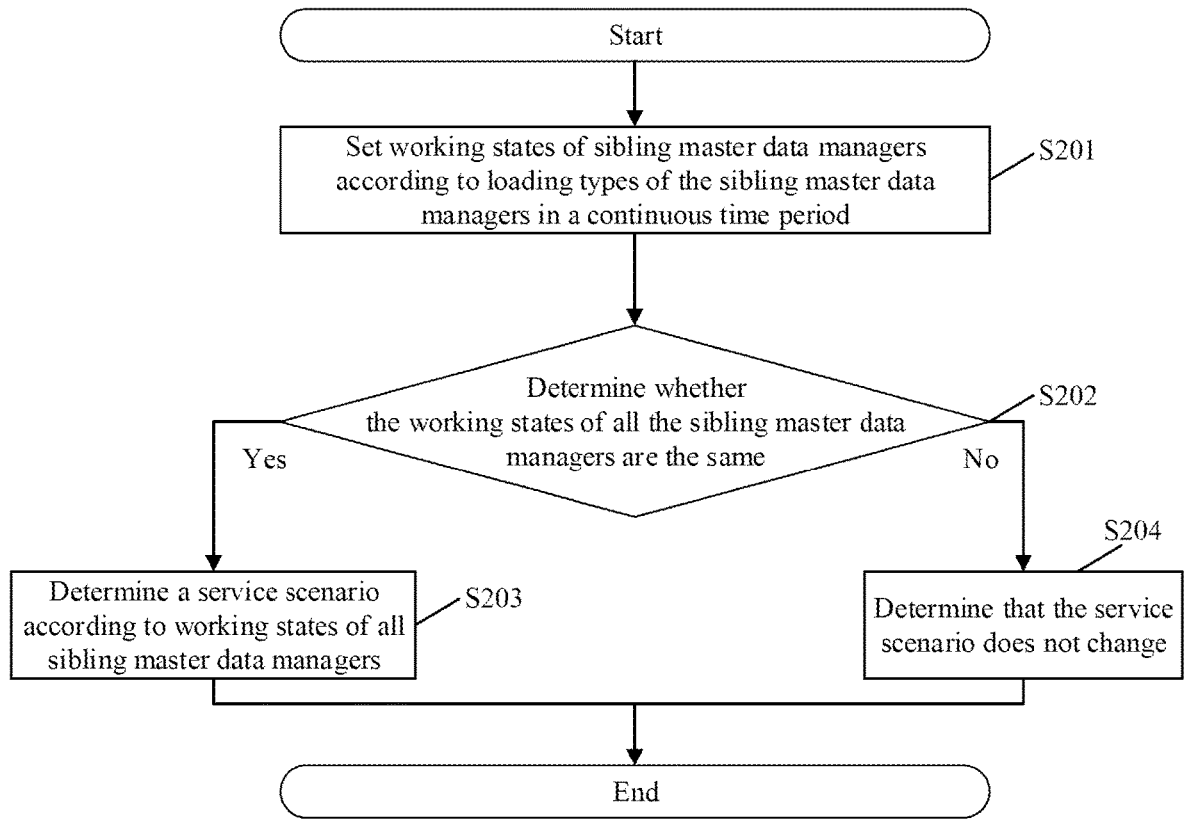
FIG. 2 is a flow diagram of a method for determining a current service scenario according to some embodiments of the present disclosure.

With reference to FIG. 2, a flow diagram of a method for determining a current service scenario according to some embodiments of the present disclosure is shown in FIG. 2. The embodiment is a further introduction to S102 in the embodiments corresponding to FIG. 1, and further embodiments can be obtained by combining the current embodiment with the embodiments corresponding to FIG. 1. The embodiment may include operations S201 to S204 as follows.

At S201, working states of the sibling master data managers are set according to loading types of the sibling master data managers in a continuous time period.

At S202, it is determined whether working states of all the sibling master data managers are the same; when the working states of all the sibling master data managers are the same, the flow proceeds to S203; and when the working states of all the sibling master data managers are not the same, the flow proceeds to S204.

At S203, a service scenario is determined according to the working states of all the sibling master data managers.

At S204, it is determined that the service scenario does not change.

In the above embodiments, the working states are set according to the loading types of the sibling master data managers in a continuous time period. For example, the number of times of read and write request allocation received by the sibling master data managers may be counted according to time slices (that is, preset periods). When the number of times of read and write request allocation is greater than a preset value, the loading types of the sibling master data managers in a current time slice may be set as high-loading types. When the number of times of read and write request allocation is less than or equal to the preset value, the loading types of the sibling master data managers in the current time slice may be set as low-loading types. When the loading types of the sibling master data managers in all time slices of the continuous time period are high-loading types, the working states of the sibling master data managers are set as high-loading working states. When the loading types of the sibling master data managers in all time slices of the continuous time period are low-loading types, the working states of the sibling master data managers are set as low-loading working states. Through the above method, a working state of a single sibling master data manager may be obtained. After the working states of all the sibling master data managers are obtained, when the working states of all the sibling master data managers are high-loading working state, it is determined that the service scenario is a high-band-width scenario. When the working states of all the sibling master data managers are low-loading working states, it is determined that the service scenario is a high-quality-of-service scenario.

In some exemplary implementations of the embodiments, whether the working states of all the sibling master data managers are the same may be determined through a method as follows. A sibling master data manager satisfying preset conditions is selected from all the sibling master data managers, where the preset conditions are that a working state changes and a loading type is different from a loading type of a sibling slave data manager of the same data management group. A working state of the sibling master data manager satisfying the preset conditions is written into a query message and the query message is forwarded to a next sibling master data manager in a preset sequence, such that all the sibling master data managers write working states into the query message. Whether the working states of all the sibling master data managers are the same is determined according to the query message. The above preset sequence may be a sequence of module numbers from small to large.

In some exemplary embodiments, after the service scenario is determined according to the working states of all the sibling master data managers, a first sibling master data manager that writes the working state into the query message is set as a start module, and the start module is controlled to send service scenario switching messages to the write managers, the reclaim block managers and the journal managers of the solid state drive. Through the above method, only one sibling master data manager sends a control message for switching loading throughout, so that consistency of system service states may be ensured.

The flow described in the above embodiments is described below through an embodiment during practical application.

A solid internal mater task layout is as follows.

As shown in Table 1, in a high-quality-of-service scenario, the number of working DMs changes from 8 to 4, and Garbage collection (GC, which is a garbage collection behavior in an SSD) tasks of CPU cores where the 4 DMs work are migrated to other CPU cores. In this case, DMs work in cores CPU0, CPU2, CPU4 and CPU6, and WMs, RBMs and JMs work in cores CPU1, CPU3, CPU5 and CPU7.

TABLE 1

Task allocation table in high-quality-of-service scenario

|     | CPU0 | CPU1 | CPU2 | CPU3 | CPU4 | CPU5 | CPU6 | CPU7 |
| --- | --- | --- | --- | --- | --- | --- | --- | --- |
| DM  | R    | IDLE | R    | IDLE | R    | IDLE | R    | IDLE |
| WM  | NA   | R    | NA   | R    | NA   | R    | NA   | R    |
| RBM | IDLE | R    | IDLE | R    | IDLE | R    | IDLE | R    |
| JM  | NA   | S    | NA   | S    | NA   | M    | NA   | S    |

With reference to Table 2, in a high-band-width scenario, the number of DMs and RBMs changes from 4 to 8, which are distributed as follows:

TABLE 2

Task allocation table in high-band-width scenario

|     | CPU0 | CPU1 | CPU2 | CPU3 | CPU4 | CPU5 | CPU6 | CPU7 |
| --- | --- | --- | --- | --- | --- | --- | --- | --- |
| DM  | R    | R    | R    | R    | R    | R    | R    | R    |
| WM  | NA   | R    | NA   | R    | NA   | R    | NA   | R    |
| RBM | R    | R    | R    | R    | R    | R    | R    | R    |
| JM  | NA   | S    | NA   | S    | NA   | M    | NA   | S    |

In a high-band-width scenario, DMs and RBMs work in cores CPU0 to CPU7, and WMs and JMs work in cores CPU1, CPU3, CPU5 and CPU7. In a high-quality-of-service scenario, DM works in cores CPU0, CPU2, CPU4 and CPU6, and WMs, RBMs and JMs work in cores CPU1, CPU3, CPU5 and CPU7. In the above table, R represents run, NA represents non-applicable, S represents slave, M represents master, and IDLE represents that a task on a core is not working.

A high-loading scenario and a high-quality-of-service scenario are required to be monitored in the DMs, and when it is monitored that the scenario changes, a task layout switching action is required to be made in time. The need to perform task layout switching is detected by DM, and the task layout switching is initiated by the DM. In order to achieve the task layout switching, the DMs are initialized as follows: 1) the DMs are divided into 4 groups according to a corresponding relation between DMs and WMs, and each group has 2 DMs. 2) The DMs on cores CPU0, CPU2, CPU4 and CPU6 are called as sibling master data managers (DM_SM), and remaining DMs are called as sibling slave data managers (DM_SS). 3) All the DMs are initialized to be in high-loading working states.

A control method for switching a loading type of an individual DM is as follows.

Individual loading type change is carried out only in DM_SM, and DM_SS passively receives a command from DM_SM. The DM saves its own current loading type (DM_LOW_LOADING or DM_HIGH_LOADING) and a working state (DM_LOW_LOADING_IDLE, DM_LOW_LOADING_WORKING or DM_HIGH_LOADING_WORKING), and DM_SM is responsible for managing a loading type (DM_LOW_LOADING or DM_HIGH_LOADING) of a group. DM_SS passively receives a control command to set its own loading type and working state, and does not actively make decisions. According to the embodiments, the loading type of DM_SS may be set as the loading type of the group. DM_LOW_LOADING_IDLE refers to a low-loading idle state, DM_LOW_LOADING_WORKING refers to a low-loading working state and DM_HIGH_LOADING_WORKING refers to a high-loading working state. DM_LOW_LOADING refers to a low-loading type and DM_HIGH_LOADING refers to a high-loading type.

The allocation quantity of df (resources of read and write request allocation) is counted according to time slices. A time slice is currently set as, for example, 10 ms. When the allocation quantity is lower than threshold T_low within 10 ms, a current loading type is marked as DM_LOW_LOADING. When the allocation quantity is higher than threshold T_high, the current loading type is marked as DM_HIGH_LOADING.

Under the conditions that a current working state of DM_SM is DM_LOW_LOADING_WORKING, and a loading type in consecutive T_filter time slices is DM_HIGH_LOADING, DM_SM may switch its own working state to DM_HIGH_LOADING_WORKING. When a current working state of DM_SM is DM_HIGH_LOADING_WORKING, and a loading type in continuous T_filter time slices is DM_LOW_LOADING, DM_SM may switch its own working state to DM_LOW_LOADING_WORKING. DM_SS receives a loading type switch command sent by a certain DM_SM, and DM_SS switches a working state according to the loading type indicated in the loading type switch command. The working state of DM_SS may be switched only between DM_LOW_LOADING_IDLE and DM_HIGH_LOADING_WORKING, where DM_LOW_LOADING_IDLE refers to a low-loading idle state.

An overall control method for switching loading types is as follows.

Figure 3:
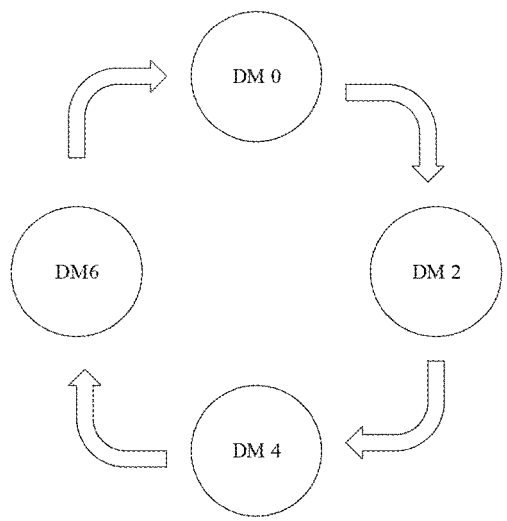
FIG. 3 is a schematic diagram of a mode for transmitting a query message according to some embodiments of the present disclosure.

As shown in FIG. 3, a loading state of the DM is checked through communication between DM_SM, a message is transmitted in a ring structure, and when all DM_SM are in working state DM_HIGH_LOADIN_WORKING or DM_LOW_LOADING_WORKING, WMs, JMs and RBMs are notified. Query states of the DM include DM_LOADING_QUERY_IDLE (which means that a current query message is not sent), DM_LOADING_QUERY_WAIT_BACK (which means that a current query message is sent but not taken back), and DM_LOADING_QUERY_TAKE_BACK (which means that a query message is taken back). DM0, DM2, DM4 and DM6 in FIG. 3 all represent DM_SM. A transmission direction of the query message is DM0->DM2->DM4->DM6.

When a working state of DM_SM changes and a working state of this DM_SM is inconsistent with a loading type of a current group, a loading query message is sent, and a loading query state is switched to DM_LOADING_QUERY_WAIT_BACK. An initiating DM_SM (referred to as "DM_SM initiate") sends loading query message to a next DM_SM (referred to as "DM_SM next"), and records "start node" in the message. After the message is sent, a query state of this group is set as DM_LOADING_QUERY_WAIT_BACK. The "DM_SM next" adds its own working state and query state to the message and forwards the message to a next DM_SM. When DM_SM receives a query message in which start node is itself, the query state is set as DM_LOADING_QUERY_TAKE_BACK. According to the states of 4 DM_SM, whether all DM groups are in the same working state is determined. Herein, the start node refers to first DM_SM that sends a loading query message.

When a working state of a certain group is inconsistent with a working state of a current group, no processing is carried out. When a query state of a certain group is DM_LOADING_QUERY_IDLE, no processing is carried out. When a query state of a certain group is DM_LOADING_QUERY_WAIT_BACK, and a current node identity (id) is less than node id of DM_SM having a query state of DM_LOADING_QUERY_WAIT_BACK in this message, no processing is carried out. In other cases, after states of all DM_SM are switched, RBMs, JMs and WMs are notified of the task loading change. Through this method, it is ensured that after states of all DMs change, only one DM sends out a control message for switching loading, and consistency of system states may be ensured. Through the above method, high quality of service or a high throughput may be achieved under the condition of limited hardware resources.

Figure 4:
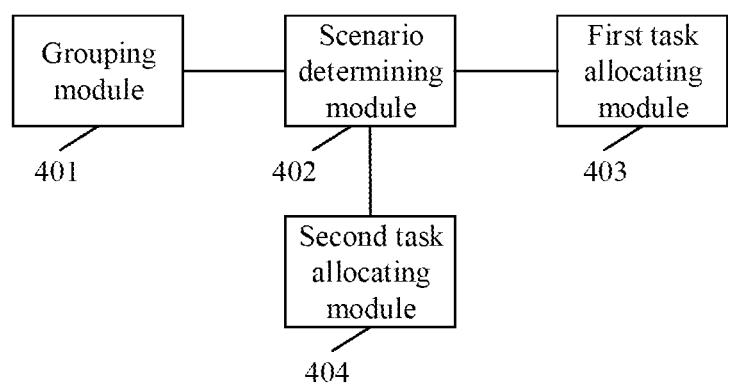
FIG. 4 is a schematic structural diagram of a task allocation system for a solid state drive according to some embodiments of the present disclosure.

With reference to FIG. 4, a schematic structural diagram of a task allocation system for a solid state drive according to some embodiments of the present disclosure is shown in FIG. 4. The solid state drive includes data managers configured to execute data management, write managers configured to execute data write, reclaim block managers configured to collect garbage data, and journal managers configured to save snapshots. The system may include:
- a grouping module 401, configured to divide the data managers of the solid state drive into a plurality of data management groups, where each data management group includes a sibling master data manager and at least one sibling slave data manager;
- a scenario determining module 402, configured to determine a service scenario according to working states of all sibling master data managers;
- a first task allocating module 403, configured to control, when the service scenario is a high-band-width scenario, the sibling master data managers and the sibling slave data managers to work in corresponding CPU cores, and allocate tasks to all the sibling master data managers and all the sibling slave data managers, where in the high-band-width scenario, the reclaim block managers of the solid state drive corresponding to all the CPU cores are in working states; and a second task allocating module 404, configured to control, when the service scenario is a high-quality-of-service scenario, the sibling master data managers to work in corresponding CPU cores, set working states of the sibling slave data managers as idle states through the sibling master data managers, and allocate tasks to all the sibling master data managers, where in the high-quality-of-service scenario, the write managers, the reclaim block managers and the journal managers of the solid state drive all work only in CPU cores corresponding to the sibling slave data managers.

According to the embodiments, the data managers of the solid state drive are divided into a plurality of data management groups, and a current service scenario is determined according to working states of sibling master data managers in all the data management groups. A high-band-width scenario requires an increase in the throughput of data. According to the embodiments of the present disclosure, when the service scenario is a high-band-width scenario, the sibling master data managers and the sibling slave data managers are controlled to work in their corresponding CPU cores, so as to allocate tasks to all the sibling master data managers and all the sibling slave data managers. A high-quality-of-service scenario requires a reduction in the task processing delay. According to the embodiments of the present disclosure, when the service scenario is a high-quality-of-service scenario, the sibling master data managers are controlled to work in corresponding CPU cores, and working states of the sibling slave data managers are set as idle states through the sibling master data managers, so as to allocate tasks only to all the sibling master data managers. It can be seen from the above content that, according to the embodiments of the present disclosure, all the data managers are controlled to jointly process data management tasks in a high-band-width scenario, such that a throughput of data is improved; and the sibling master data managers are controlled to work in the corresponding CPU cores in the high-quality-of-service scenario, and the write managers, the reclaim block managers and the journal managers of the solid state drive do not work in the same CPU cores as the sibling master data managers such that timeliness of processing tasks by the sibling master data managers may be improved, and a waiting delay may be reduced. Therefore, according to the embodiments of the present disclosure, a task allocation mode may be set according to the service scenario, so as to process data with high quality of service or high band width under the condition of limited hardware resources.

In some exemplary embodiments, the grouping module 401 may be configured to determine a corresponding relation between the data managers and the write managers in the solid state drive, and set data managers corresponding to a same write manager as belonging to a same data management group.

In some exemplary embodiments, the scenario determining module 402 may include:
a working state determining unit, configured to set the working states of the sibling master data managers according to loading types of the sibling master data managers in a continuous time period;
a state determining unit, configured to determine whether the working states of all the sibling master data managers are the same; and
a scenario analyzing unit, configured to determine, when the working states of all the sibling master data managers are the same, the service scenario according to the working states of all the sibling master data managers.

In some exemplary embodiments, the working state determining unit may be configured to count, according to time slices, the number of times of read and write request allocation received by the sibling master data managers; set the loading types of the sibling master data managers as high-loading types when the number of times of read and write request allocation is greater than a preset value; set the loading types of the sibling master data managers as low-loading types when the number of times of read and write request allocation is less than or equal to the preset value; and set the working states of the sibling master data managers as high-loading working states when the loading types of the sibling master data managers in a continuous time period are all high-loading types. The working state determining unit may be further configured to set the working states of the sibling master data managers as low-loading working states when the loading types of the sibling master data managers in the continuous time period are all low-loading types.

In some exemplary embodiments, the scenario analyzing unit may be configured to determine that the service scenario is the high-band-width scenario when the working states of all the sibling master data managers are high-loading working state. The scenario analyzing unit may be further configured to determine that the service scenario is the high-quality-of-service scenario when the working states of all the sibling master data managers are all low-loading working states.

In some exemplary embodiments, the state determining unit may be configured to select a sibling master data manager satisfying preset conditions from all the sibling master data managers, where the preset conditions are that the working state of the sibling master data manager changes and the loading type of the sibling master data manager is different from a loading type of the sibling slave data manager belonging to a same data management group as the sibling master data manager; and write the working state of the sibling master data manager satisfying the preset conditions into a query message and forward the query message to a next sibling master data manager in a preset sequence, such that all the sibling master data managers write their respective working states into the query message. The state determining unit may be further configured to determine whether the working states of all the sibling master data managers are the same according to the query message.

In some exemplary embodiments, the scenario determining module may further include:
a message sending module, configured to set, after the service scenario is determined according to the working states of all the sibling master data managers, a first sibling master data manager that writes the working state into the query message as a start module, and control the start module to send service scenario switching messages to the write managers, the reclaim block managers and the journal managers of the solid state drive.

Since the embodiments of the system correspond to the embodiments of the method, reference can be made to the description of the embodiments of the method for the embodiments of the system, which will not be repeated herein.

The embodiments of the present disclosure further provide a storage medium. The storage medium stores a computer program, and the computer program, when being executed by a processor, causes the processor to implement operations provided in the above embodiments. The storage medium can include: a USB flash disk, a mobile hard disk, a Read-Only Memory (ROM), a Random Access Memory (RAM), a diskette or optical disk, and other media which can store program codes.

The embodiments of the present disclosure further provide an electronic device. The electronic device can include a memory and a processor, the memory stores a computer program, and the processor implements operations provided in the above embodiments when calling the computer program in the memory. Certainly, the electronic device may further include various network interfaces, power supplies and other assemblies.

Each embodiment of the description is described in a progressive manner, each embodiment focuses on differences from other embodiments, and for the same and similar parts between the embodiments, reference can be made to each other. Since the system disclosed in the embodiments corresponds to the method disclosed in the embodiments, the description is relatively simple, and for related portions, reference can be made to the description of the method. It should be noted that several improvements and modifications can also be made by those having ordinary skill in the art without departing from the principles of the present disclosure, and these improvements and modifications also fall within the scope of protection of the present disclosure.

It should be noted that relational terms such as first and second herein are merely used to distinguish one entity or operation from another entity or operation without certainly requiring or implying any such actual relation or order between such entities or operations. In addition, terms "include" and "comprise" or their any other variations are intended to cover non-exclusive inclusions, such that a process, method, article or apparatus including a series of elements not only includes those elements, but also includes other elements that are not explicitly listed, or also includes inherent elements of the process, method, article or apparatus. In the case of no more limitations, the element limited by the sentence "including a . . . " does not exclude that there are other same elements in the process, method, article or apparatus including the element.

What is claimed is:

1. A task allocation method for a solid state drive, wherein the solid state drive comprises data managers configured to execute data management, write managers configured to execute data write, reclaim block managers configured to collect garbage data, and journal managers configured to save snapshots; and the task allocation method for the solid state drive comprises:
   dividing the data managers into a plurality of data management groups, wherein each data management group comprises a sibling master data manager and at least one sibling slave data manager;
   determining a service scenario according to working states of all sibling master data managers;
   when the service scenario is a high-band-width scenario, controlling the sibling master data managers and the sibling slave data managers to work in corresponding Central Processing Unit (CPU) cores, and allocating tasks to all the sibling master data managers and all the sibling slave data managers, wherein in the high-bandwidth scenario, the reclaim block managers corresponding to all CPU cores are in working states; and
   when the service scenario is a high-quality-of-service scenario, controlling the sibling master data managers to work in corresponding CPU cores, setting working states of the sibling slave data managers as idle states through the sibling master data managers, and allocating tasks to all the sibling master data managers, wherein in the high-quality-of-service scenario, the write managers, the reclaim block managers and the journal managers all work only in CPU cores corresponding to the sibling slave data managers.

2. The task allocation method according to claim 1, wherein dividing the data managers into the plurality of data management groups comprises:
   determining a corresponding relation between the data managers and the write managers in the solid state drive, and setting data managers corresponding to a same write manager as belonging to a same data management group.

3. The task allocation method according to claim 1, wherein determining the service scenario according to the working states of all the sibling master data managers comprises:
   setting the working states of the sibling master data managers according to loading types of the sibling master data managers in a continuous time period;
   determining whether the working states of all the sibling master data managers are the same; and
   determining, when the working states of all the sibling master data managers are the same, the service scenario according to the working states of all the sibling master data managers.

4. The task allocation method according to claim 3, wherein setting the working states of the sibling master data managers according to the loading types of the sibling master data managers in the continuous time period comprises:
   counting, according to time slices, the number of times of read and write request allocation received by the sibling master data managers;
   setting the loading types of the sibling master data managers as high-loading types when the number of times of read and write request allocation is greater than a preset value;
   setting the loading types of the sibling master data managers as low-loading types when the number of times of read and write request allocation is less than or equal to the preset value;
   setting the working states of the sibling master data managers as high-loading working states when the loading types of the sibling master data managers in the continuous time period are all high-loading types; and
   setting the working states of the sibling master data managers as low-loading working states when the loading types of the sibling master data managers in the continuous time period are all low-loading types.

5. The task allocation method according to claim 4, wherein determining the service scenario according to the working states of all the sibling master data managers comprises:
   determining that the service scenario is the high-bandwidth scenario when the working states of all the sibling master data managers are the high-loading working states; and
   determining that the service scenario is the high-quality-of-service scenario when the working states of all the sibling master data managers are the low-loading working states.

6. The task allocation method according to claim 3, wherein determining whether the working states of all the sibling master data managers are the same comprises:
   selecting a sibling master data manager satisfying preset conditions from all the sibling master data managers, wherein the preset conditions are that the working state of the sibling master data manager changes and the loading type of the sibling master data manager is different from a loading type of the sibling slave data manager belonging to a same data management group as the sibling master data manager;

writing the working state of the sibling master data manager satisfying the preset conditions into a query message and forwarding the query message to a next sibling master data manager in a preset sequence, such that all the sibling master data managers write their respective working states into the query message; and determining whether the working states of all the sibling master data managers are the same according to the query message.

7. The task allocation method according to claim 6, wherein after determining the service scenario according to the working states of all the sibling master data managers, the method further comprises:

setting a first sibling master data manager that writes the working state into the query message as a start module, and controlling the start module to send service scenario switching messages to the write managers, the reclaim block managers and the journal managers.

8. An electronic device for task allocation for a solid state drive, wherein the solid state drive comprises data managers configured to execute data management, write managers configured to execute data write, reclaim block managers configured to collect garbage data, and journal managers configured to save snapshots, and the electronic device comprises a memory and a processor, wherein the memory stores a computer program, and the processor implements following operations when calling the computer program in the memory:

dividing the data managers into a plurality of data management groups, wherein each data management group comprises a sibling master data manager and at least one sibling slave data manager;

determining a service scenario according to working states of all sibling master data managers;

when the service scenario is a high-band-width scenario, controlling the sibling master data managers and the sibling slave data managers to work in corresponding Central Processing Unit (CPU) cores, and allocating tasks to all the sibling master data managers and all the sibling slave data managers, wherein in the high-band-width scenario, the reclaim block managers corresponding to all CPU cores are in working states; and when the service scenario is a high-quality-of-service scenario, controlling the sibling master data managers to work in corresponding CPU cores, setting working states of the sibling slave data managers as idle states through the sibling master data managers, and allocating tasks to all the sibling master data managers, wherein in the high-quality-of-service scenario, the write managers, the reclaim block managers and the journal managers all work only in CPU cores corresponding to the sibling slave data managers.

9. A non-transitory storage medium for task allocation for a solid state drive, wherein the solid state drive comprises data managers configured to execute data management, write managers configured to execute data write, reclaim block managers configured to collect garbage data, and journal managers configured to save snapshots, and the non-transitory storage medium stores a computer-executable instruction, wherein the computer-executable instruction, when being loaded and executed by a processor, causes the processor to implement following operations:

dividing the data managers into a plurality of data management groups, wherein each data management group comprises a sibling master data manager and at least one sibling slave data manager;

determining a service scenario according to working states of all sibling master data managers;

when the service scenario is a high-band-width scenario, controlling the sibling master data managers and the sibling slave data managers to work in corresponding Central Processing Unit (CPU) cores, and allocating tasks to all the sibling master data managers and all the sibling slave data managers, wherein in the high-band-width scenario, the reclaim block managers corresponding to all CPU cores are in working states; and when the service scenario is a high-quality-of-service scenario, controlling the sibling master data managers to work in corresponding CPU cores, setting working states of the sibling slave data managers as idle states through the sibling master data managers, and allocating tasks to all the sibling master data managers, wherein in the high-quality-of-service scenario, the write managers, the reclaim block managers and the journal managers all work only in CPU cores corresponding to the sibling slave data managers.

10. The task allocation method according to claim 1, wherein a master-slave allocation ratio between the sibling master data manager and the at least one sibling slave data manager in the data management group is determined according to a ratio of the number of data managers that are always in working states and the number of data managers that may enter working states.

11. The task allocation method according to claim 3, after determining, when the working states of all the sibling master data managers are the same, the service scenario according to the working states of all the sibling master data managers, further comprising:

setting a loading type and a working state of the sibling slave data manager through the sibling master data manager according to the determined service scenario, wherein the sibling slave data manager does not have authority to modify the loading type and the working state of the sibling slave data manager.

12. The task allocation method according to claim 1, wherein determining the service scenario according to the working states of all the sibling master data managers comprises:

determining a service pressure of each sibling master data manager;

setting the working state of the sibling master data manager as high-loading working state when the service pressure of the sibling master data manager is greater than a threshold value;

setting the working state of the sibling master data manager as low-loading working state when the service pressure of the sibling master data manager is less than or equal to a threshold value; and determining the service scenario according to the working states of all the sibling master data managers.

13. The task allocation method according to claim 12, wherein determining the service pressure of each sibling master data manager comprises:

determining the service pressure according to a resource quantity of read and write request allocation per second.

14. The task allocation method according to claim 3, further comprising:
when the working states of all the sibling master data managers are not the same, determining that the service scenario does not change.

15. The task allocation method according to claim 1, wherein when the service scenario is the high-quality-of-service scenario, Garbage Collection (GC) tasks of CPU cores corresponding to the sibling master data managers are migrated to the CPU cores corresponding to the sibling slave data managers.

16. The task allocation method according to claim 1, wherein when the service scenario is the high-band-width scenario, the write managers and the journal managers of the solid state drive only work in CPU cores corresponding to the sibling slave data managers.

17. The electronic device according to claim 8, wherein dividing the data managers into the plurality of data management groups comprises:
determining a corresponding relation between the data managers and the write managers in the solid state drive, and setting data managers corresponding to a same write manager as belonging to a same data management group.

18. The electronic device according to claim 8, wherein determining the service scenario according to the working states of all the sibling master data managers comprises:
setting the working states of the sibling master data managers according to loading types of the sibling master data managers in a continuous time period;
determining whether the working states of all the sibling master data managers are the same; and
determining, when the working states of all the sibling master data managers are the same, the service scenario according to the working states of all the sibling master data managers.

19. The electronic device according to claim 18, wherein setting the working states of the sibling master data managers according to the loading types of the sibling master data managers in the continuous time period comprises:

counting, according to time slices, the number of times of read and write request allocation received by the sibling master data managers;
setting the loading types of the sibling master data managers as high-loading types when the number of times of read and write request allocation is greater than a preset value;
setting the loading types of the sibling master data managers as low-loading types when the number of times of read and write request allocation is less than or equal to the preset value;
setting the working states of the sibling master data managers as high-loading working states when the loading types of the sibling master data managers in the continuous time period are all high-loading types; and
setting the working states of the sibling master data managers as low-loading working states when the loading types of the sibling master data managers in the continuous time period are all low-loading types.

20. The electronic device according to claim 18, wherein determining whether the working states of all the sibling master data managers are the same comprises:
selecting a sibling master data manager satisfying preset conditions from all the sibling master data managers, wherein the preset conditions are that the working state of the sibling master data manager changes and the loading type of the sibling master data manager is different from a loading type of the sibling slave data manager belonging to a same data management group as the sibling master data manager;
writing the working state of the sibling master data manager satisfying the preset conditions into a query message and forwarding the query message to a next sibling master data manager in a preset sequence, such that all the sibling master data managers write their respective working states into the query message; and
determining whether the working states of all the sibling master data managers are the same according to the query message.

* * * * *